July 9, 1968 K. S. GARDEN 3,391,891
VACUUM BOTTLE HOLDER FOR VEHICLE SEATS
Filed June 23, 1966 2 Sheets-Sheet 1

Kenneth S. Garden
INVENTOR.

July 9, 1968   K. S. GARDEN   3,391,891
VACUUM BOTTLE HOLDER FOR VEHICLE SEATS
Filed June 23, 1966   2 Sheets-Sheet 2

Kenneth S. Garden
INVENTOR.

BY *Clarence A. O'Brien*
*and Harvey B. Jacobson*
Attorneys

United States Patent Office 3,391,891
Patented July 9, 1968

3,391,891
VACUUM BOTTLE HOLDER FOR VEHICLE SEATS
Kenneth S. Garden, P.O. Box 248,
Highland, Calif. 92346
Filed June 23, 1966, Ser. No. 559,987
6 Claims. (Cl. 248—311)

ABSTRACT OF THE DISCLOSURE

The device disclosed is formed almost entirely of wire, the frame comprising parallel side members bent upwardly from a bottom bight portion, having eyes at their upper ends and joined by four horizontal brace wires welded thereto; a wire shelf member having eyes pivotally receiving the lowermost brace and abutting the lower frame bight portion to limit downward rotation of said shelf member to a horizontal position supporting a vacuum bottle but permitting said shelf member to fold upwardly against said frame. Semi-circular wire bails have eyes at their ends which pivotally receive the remaining three of said horizontal brace wires, said bails having shoulders abutting said vertical side members which limit downward swinging of said bails to horizontal position to confine said vacuum bottle in said holder, said bails being foldable upwardly into collapsed parallel relation with said frame. A U-shaped wire support member has hooked end portions which may be fed through the eyes on the upper ends of said side members, said support member hooking over a seat back to support said holder thereon.

BACKGROUND OF THE INVENTION

Field of the invention

Vacuum bottles as well as other bottles require support and protection and numerous devices have been provided for affording this. The closest prior art is found in U.S. patents, No. 882,854, issued to W. S. Weaver on Mar. 24, 1908, and No. 2,279,442, issued to J. B. Burns et al. on Apr. 14, 1942. These references show collapsible bottle receptacles, the Weaver device being adapted for mounting in a recess in an outer wall of a building to support bottles of milk out of the reach of animals between the time of delivery and the time when the occupant of said building is able to reclaim said milk. The Burns et al. holder is for use in an automobile as an adjunct to curb service.

SUMMARY OF THE INVENTION

The present invention has for its principal object the provision of a simple vacuum bottle holder formed of wire which is relatively simple in design and may be produced at low cost and which is readily foldable into small space when not in use but which, when unfolded, offers a secure repository for a vacuum bottle and which is adapted to hold a pair of drinking vessels for use in dispensing the contents of said bottle.

The preferred embodiment disclosed embodies a U-shaped wire frame parallel side members of which are united by cross wires welded thereto, said cross wires having pivoted thereon a lower shelf member and a series of vertically spaced bails all of which have abutting surfaces which engage the frame to limit their downward swinging to horizontal positions whereby said shelf member and bails cooperate in supporting a vacuum bottle in said holder. Upper ends of side members of the frame provide eyes in which are slideably mounted a U-shaped support member having hooks which fits over a vehicle seat to suspend said holder therefrom.

Description of the preferred embodiment

Figure 1:
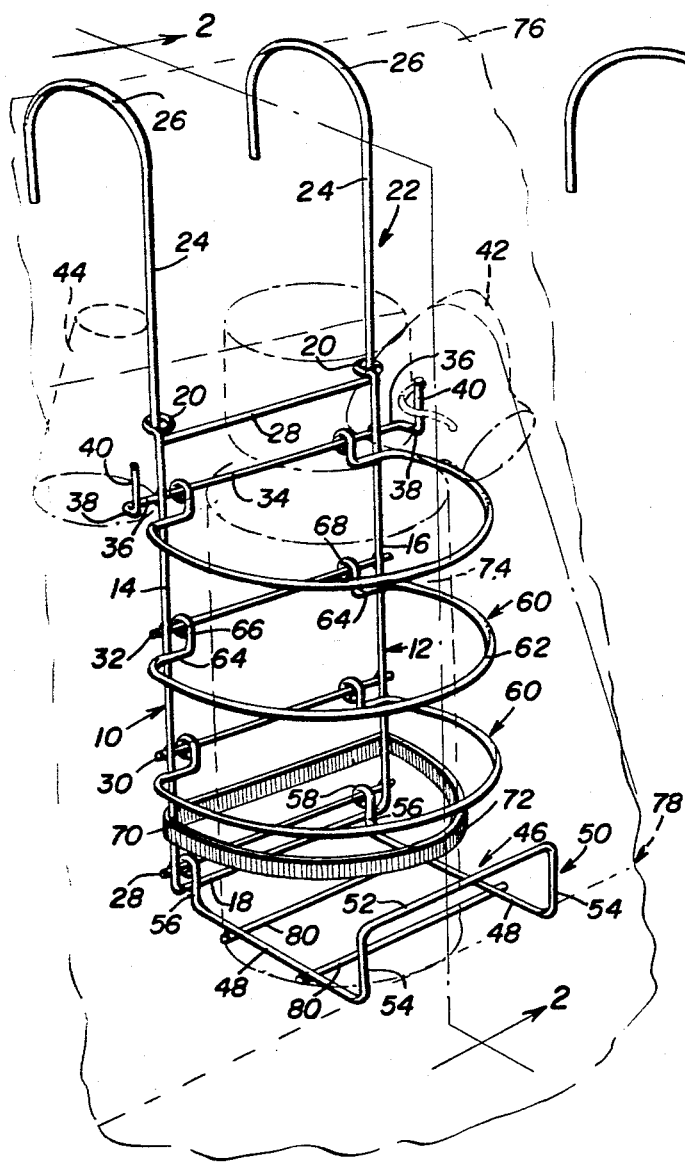
FIGURE 1 is a perspective view of the holder of the instant invention shown operatively supported from a vehicle seat, the vehicle seat and the vacuum bottle supported from the holder being illustrated in phantom lines.
Figure 2:
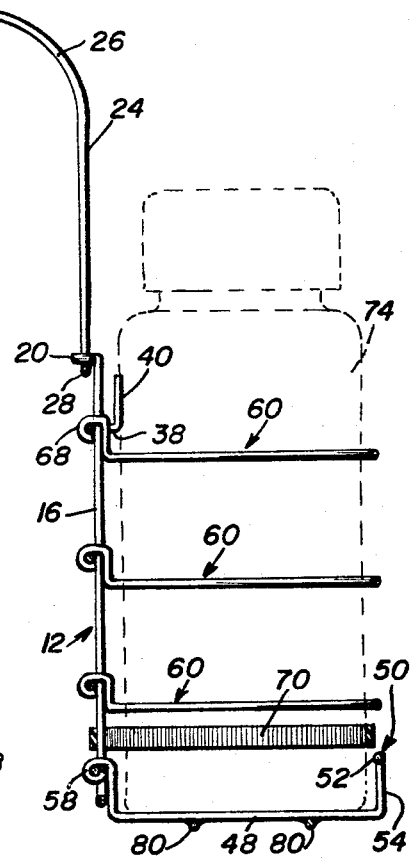
FIGURE 2 is a vertical sectional view taken substantially upon the plane indicated by section line 2—2 of FIGURE 1.

Referring now more specifically to the drawings the numeral 10 generally designates the holders of the instant invention including a support frame referred to in general by the reference numeral 12. The support frame includes a pair of elongated upstanding opposite side members 14 and 16 integrally joined together at their lower end portions by means of a transversely extending bight portion 18. The upper ends of the side members 14 and 16 include a plurality of curved portions defining a pair of horizontally disposed eye portions 20.

A hooked support member referred to in general by the reference numeral 22 is provided and includes a pair of upstanding arm members 24 whose upper end portions are smoothly curved outwardly and downwardly throughout an arc of approximately 180° to form a pair of hooked end portions 26 which open downwardly. The arm members 24 are slidably received through the eye portions 20 and are interconnected below the latter by means of an integral transversely extending bight portion 28. Accordingly, the support member is limited in upward sliding movement relative to the frame 12 by means of the bight portion 28 which abuts the undersurface portions of the eye portions 20.

The side members 14 and 16 are interconnected at points spaced vertically thereon by means of transverse rod-like braces 28, 30 and 32 and also a fourth transverse brace 34 secured between the upper end portions of the side members 14 and 16. The transverse brace 34 includes extended opposite end portions 36 projecting beyond the side members 14 and 16 and including laterally directed portions 38 projecting forwardly of the frame 12 and terminating at their forward ends, in upwardly directed terminal end portions 40 from which a cup 42 and tumbler 44 such as that illustrated in phantom lines in FIGURE 1 of the drawings may be removably supported.

The frame 12 includes a lower shelf member generally referred to by the reference numeral 46 constructed of wire-like material and including a pair of opposite sides 48 projecting forwardly of the frame 12 and interconnected at their forward ends by means of an upstanding inverted generally U-shaped bight portion generally referred to by the reference numeral 50 including a transverse member 52 and a pair of depending legs 54 whose lower ends are secured to the outer ends of the sides 48. The innermost ends of the sides 48 include upwardly directed portions 56 which terminate at their upper ends in curved eye portions 58 rotatably received on the lower transverse member or brace 28 just inwardly of the side members 14 and 16. The upwardly directed portions 56 abut the frame bight portion 18 and limit downward swinging movement of the free end of the shelf member 46. However, the shelf member 46 is pivotable from the generally horizontally disposed position illustrated in FIGURE 1 of the drawings to the upstanding position thereof illustrated in FIGURES 4 and 5 of the drawings with the bight portion 50 received between the frame side members 14 and 16 intermediate the transverse braces 30 and 32.

The holder 10 also includes three substantially identical bail members generally referred to by the reference numerals 60 and which each include a semi-circular wire-like member 62 whose end portions include laterally inwardly directed portions 64 which terminate in upturned portions 66 including upstanding eye portions 68 on their free ends. The bail members 60 are pivotally supported on the transverse braces 30, 32 and 34 by means of the eye portions 68 thereof rotatably received on the transverse braces and the laterally directed portions 64 abut the corresponding side members 14 and 16 to limit downward swinging movement of the bail members 60 as illustrated in FIGURE 1 of the drawings. However, the bail members 60 may be pivoted toward upstanding positions such as those illustrated in FIGURES 4 and 5 of the drawings.

The holder 10 also includes a resilient bail member 70 in the form of an elastic band and the elastic band is encircled about the side members 14 and 16 intermediate the transverse braces 28 and 30. The band 70 is of course stretchable and one reach or side 72 thereof may be pulled forwardly of the side members 14 and 16 into a generally semi-circular shape opening toward the side members 14 so as to snugly embrace and frictionally engage a vacuum bottle 74 supported on the shelf member 46 and received in the bail members 60.

Figure 3:
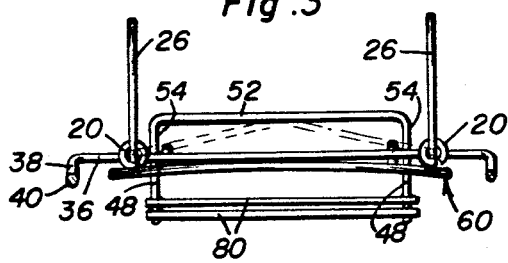
FIGURE 3 is a top plan view of the assemblage illustrated in FIGURE 2 and with flexed positions of the supporting hooks of the holder adapted for compact storage of the holder being illustrated in phantom lines and the shelf portion and plurality of rigid bail portions of the holder being illustrated in collapsed positions.
Figure 4:
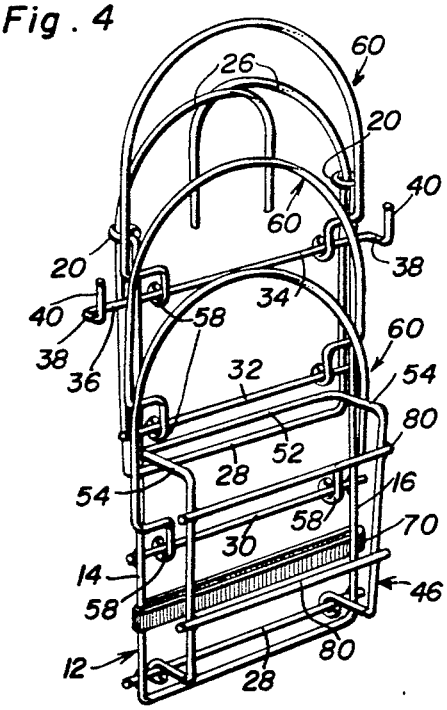
FIGURE 4 is a perspective view of the holder in a collapsed position for compact storage.
Figure 5:
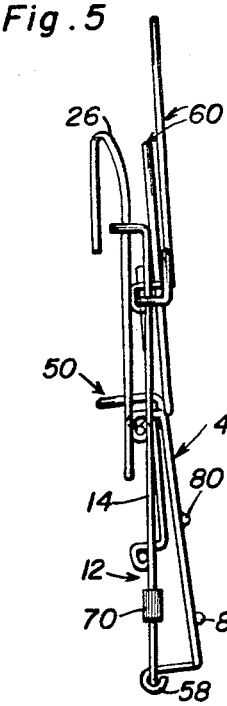
FIGURE 5 is a side elevational view of the holder in a collapsed position.

With attention now invited more specifically to FIGURES 3–5 of the drawings it may be seen that the shelf member 46 and the bail members 60 may be swung to their folded or collapsed inoperative positions and that the hooked end portions 26 may be flexed inwardly toward each other to the positions illustrated in phantom lines in FIGURE 3 of the drawings and solid lines in FIGURES 4 and 5 of the drawings for compact storage of the holder 10. The elastic band 70 is of a size to be slightly flexed and thereby somewhat taut even when the reach 72 thereof is not deflected forwardly of the medial plane of the frame 12, see FIGURES 4 and 5.

Figure 8:
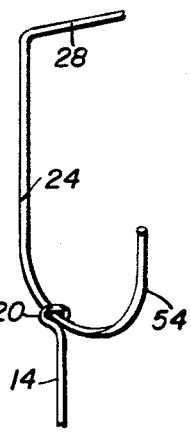
FIGURE 8 is a fragmentary perspective view of an upper portion of the holder illustrated in FIGURES 1–5 but with the hook support arm assembly of the holder engaged with the remainder of the holder in a reverse manner.

It may further be noted from FIGURES 4 and 5 of the drawings that before the hooked end portions 26 are biased toward the phantom line positions thereof illustrated in FIGURE 3 of the drawings, the arm members 24 may be slid downwardly through the eye portions 20 so as to reduce the vertical height of the upstanding holder 10, see FIGURES 4 and 5. Further, the support member 22 may be readily disengaged from the eye portions 20 by sliding the arm members 24 through the eye portions 20 and the hooked end portions 26 up through the eye portions 20. Then, the support member 22 may again be engaged with the frame 12 in a reverse position by threading the hooked end portions 26 partially through the eye portions 20 in the manner illustrated in FIGURE 8 of the drawings. This mounting of the support member will adapt the frame 12 to be supported from support members other than the seat-back portion 76 of the vehicle seat assembly (generally referred to by reference numeral 78 illustrated in FIGURE 1) such as, for instance, a flat horizontal surface such as a table, a lawn, or a sandy beach.

Figure 6:
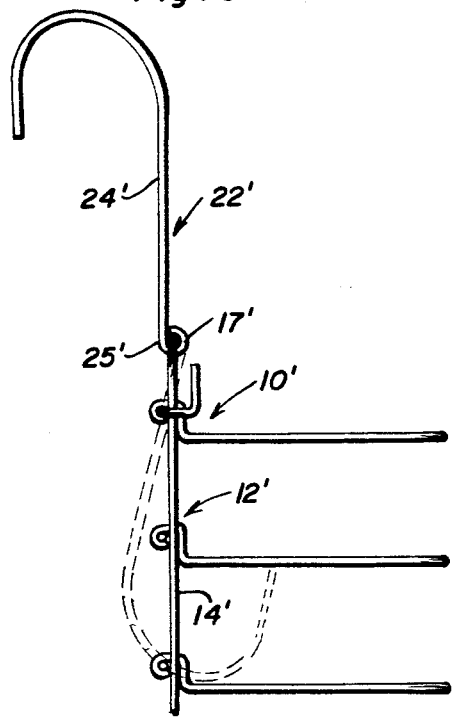
FIGURE 6 is a fragmentary enlarged side elevational view of the upper portion of the holder including a modified form of hooked support arm.

With attention now invited more specifically to FIGURE 6 of the drawings there may be seen a modified form of holder generally referred to by the reference numeral 10' and which includes a modified frame generally referred to by the reference numeral 12'. The frame 12' includes a pair of side members 14' and 16' corresponding to the side members 14 and 16 but which are interconnected at their upper ends by means of a transversely extending portion 17'. The holder 10' includes a support member 22' corresponding to the support member 22 and which includes arm members 24' corresponding to the arm members 24 but provided with integral eye portions 25' on their lower ends rotatably receiving transverse member 17' in lieu of the transversely extending bight portion 28 of the support member 22. Accordingly, the arm members 24' are pivotally supported from the transverse member 17' of the holder 10' and may be pivoted between the solid line positions thereof illustrated in FIGURE 6 to the phantom line positions thereof.

Figure 7:
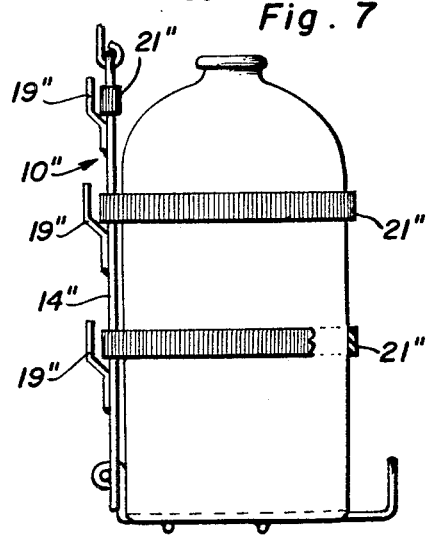
FIGURE 7 is a fragmentary side elevational view of still another modified form of holder constructed in accordance with the present invention.

With reference now more specifically to FIGURE 7 of the drawings there may be seen still another modified form of holder generally referred to by the reference numeral 10" and which includes opposite side members 14" and 16" (not shown) corresponding to the side members 14 and 16. The holder 10" is very similar in construction to the holder 10' except in lieu of bail members, such as bail members 60, the side members 14 and 16 are each provided with a plurality of rearwardly projecting hook members 19" for supporting a plurality of elastic bands 21" from the frame of the holder 10". The hook members 19" insure that the elastic bands 21", which are similar to the elastic band 70, will not slip from the frame of the holder 10" when the latter is not in use. In addition, it will be noted that the elastic bands 21" and the elastic band 70 may be utilized to retain the self member 46 of the holder 10 and the corresponding portions of the holders 10' and 10" in the folded collapsed position. Further, the shelf member 46 includes a pair of transverse members 80 which is secured between the sides 48 and form a bottom for the shelf member 46. In addition, the shelf members of the holders 10' and 10" also include similar transverse members.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A holder comprising an upstanding support frame including a pair of upstanding wire side members suitably interconnected between their upper and lower end portions by transverse wire braces welded thereto, said frame being provided with support means adjacent its upper end adapted to hang said frame from a support structure, a lower shelf-member formed of wire and having eyes for pivotally mounting an edge portion of said shelf member from the lowermost of said wire braces for swinging movement of said shelf member between a first generally horizontal limit position projecting outwardly of one side of said frame and in which said shelf member abuts against said frame, and a second limit position with the free end portion of said shelf member swung upwardly toward said frame and said shelf member generally paralleling said side members, said frame further including wire bail retaining means pivotally mounted on other of said braces with portions of said bail means spaced outwardly of said one side of said frame above said shelf member when the latter is in said first limit position and adapted to secure an upstanding article disposed on said shelf member to said frame, said bail means abutting against said frame to limit downward swinging of said bail means to horizontal positions.

2. The combination of claim 1 wherein said support means comprises upwardly projecting arm members carried by the upper end portion of said frame, said arm members including hooked upper end portions opening downwardly and the lower ends of said arms being pivotally supported from said side members for rotation about axes extending between said side members, the upper end portions of said side members including horizontally disposed eye members, said arms being slideably received through said eye members and including laterally directed portions disposed below said eye members limiting upward sliding movement of said arms relative to said side members, said laterally directed portions comprising opposite end portions of an integral bight portion extending between the lower ends of said arm members.

3. The combination of claim 1 wherein said support means comprises upwardly projecting arm members carried by the upper end portion of said frame, said arm members including hooked upper end portions opening downwardly and the lower ends of said arms being pivotally supported from said side members for rotation about axes extending between said side members, said side members including a transverse brace member extending between the upper end portions thereof, the lower ends of said arm members including eye portions rotatably journaled on corresponding end portions of said transverse brace member.

4. The combination of claim 3 wherein said retaining means comprises at least one bail member supported from said frame adapted, in conjunction with said frame, to at least substantially encircle said upstanding article.

5. The combination of claim 4 wherein said frame includes a plurality of said retaining means defining elastic bands horizontally encircling said frame at points spaced vertically therealong.

6. The combination of claim 1 wherein said retaining means includes at least one elastic band horizontally encircling said frame and at least one wire-like bail generally U-shaped in configuration, opening towards said frame from said one side thereof, and pivotally supported from said frame for rotation about an axis extending between said side members, said support means comprising upwardly projecting arm members carried by the upper end portion of said frame, said arm members including hooked upper end portions opening downwardly and the lower ends of said arms being pivotally supported from said side members for rotation about axes extending between said side members, said side members including a transverse brace member extending between the upper end portions thereof, the lower ends of said arm members including eye portions rotatably journaled on corresponding end portions of said transverse brace member.

References Cited
UNITED STATES PATENTS

| | | | |
|---|---|---|---|
| 882,854 | 3/1908 | Weaver | 248—311 |
| 1,032,497 | 7/1912 | Pederson | 248—311 |
| 1,302,354 | 4/1919 | Friedman | 248—105 |
| 2,279,442 | 4/1942 | Burns | 248—311 |
| 2,458,332 | 1/1949 | Boschan | 248—340 X |
| 3,141,937 | 7/1964 | Edward | 211—75 X |

CHANCELLOR E. HARRIS, *Primary Examiner.*